Jan. 20, 1942.   J. P. CROWLEY ET AL   2,270,418
CUTTING MACHINE
Filed Nov. 24, 1939   4 Sheets-Sheet 4

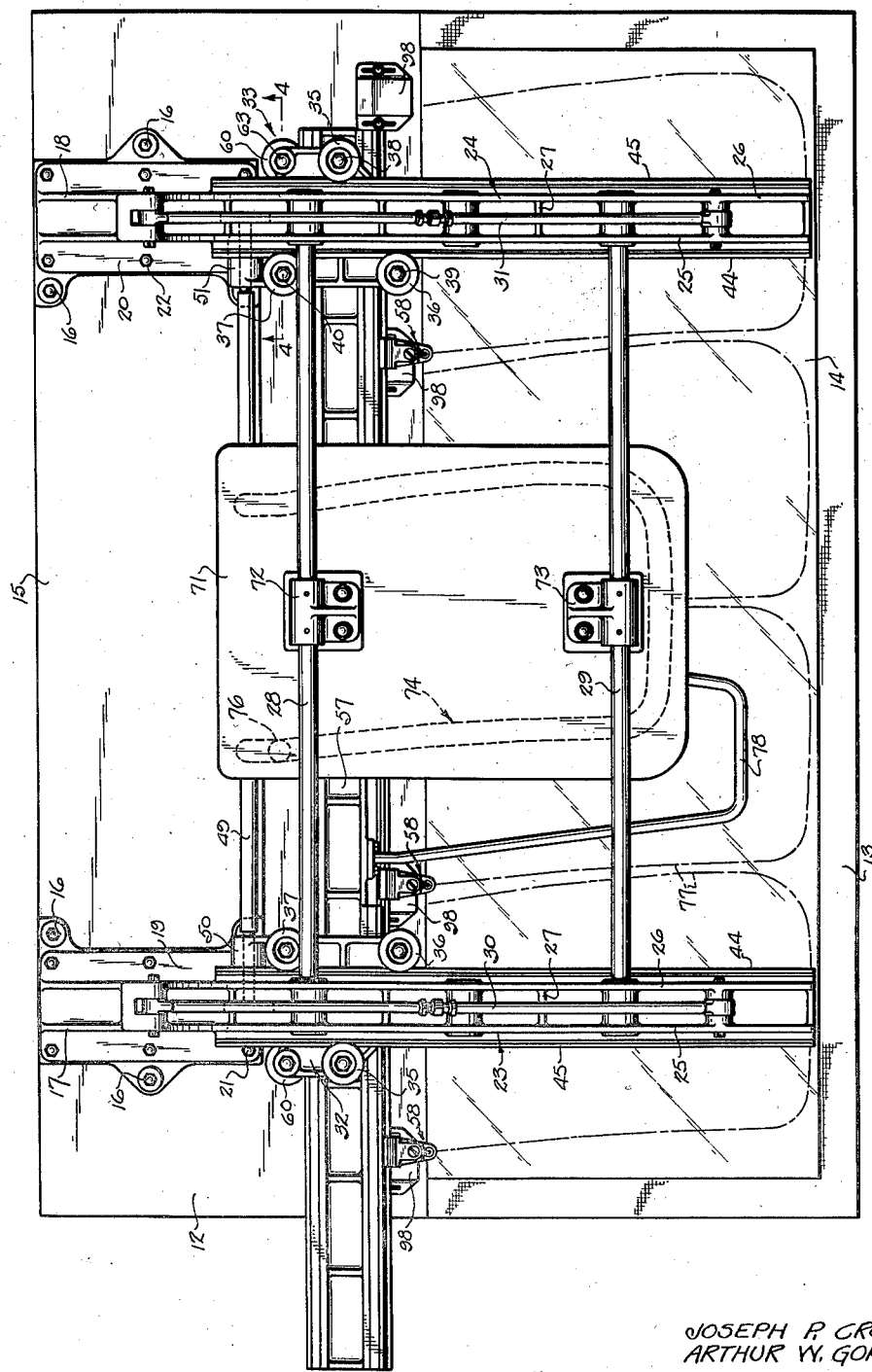
Jan. 20, 1942.  J. P. CROWLEY ET AL  2,270,418
CUTTING MACHINE
Filed Nov. 24, 1939  4 Sheets-Sheet 1
Inventors
JOSEPH P. CROWLEY,
ARTHUR W. GORALSKE.
By Frank Fraser
Attorney Jan. 20, 1942. J. P. CROWLEY ET AL 2,270,418
CUTTING MACHINE
Filed Nov. 24, 1939 4 Sheets-Sheet 2
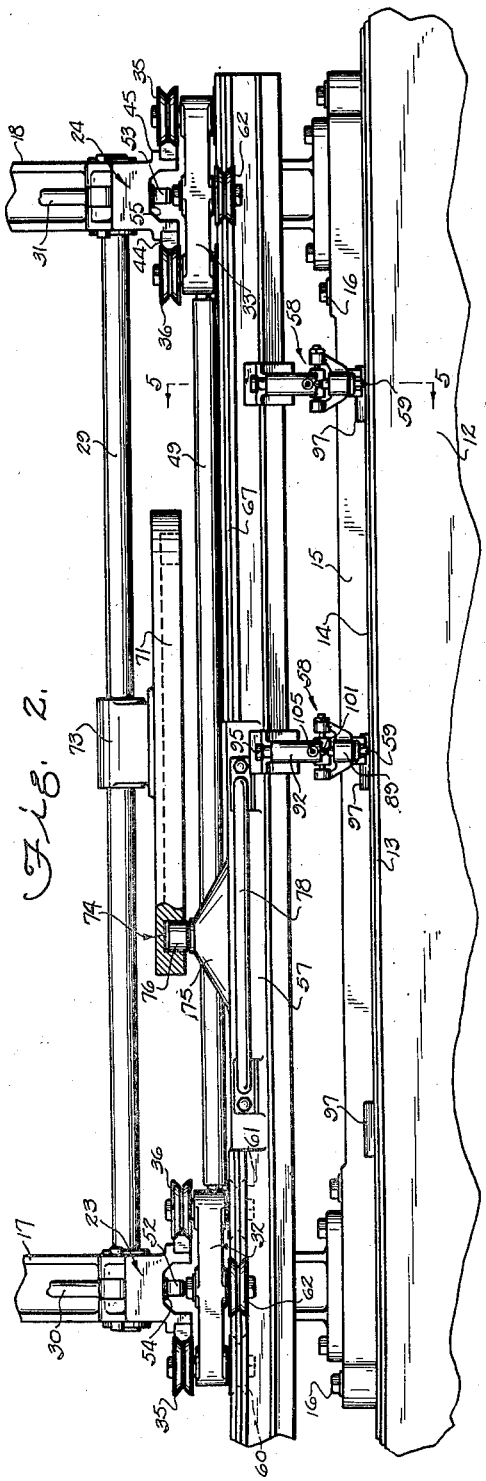
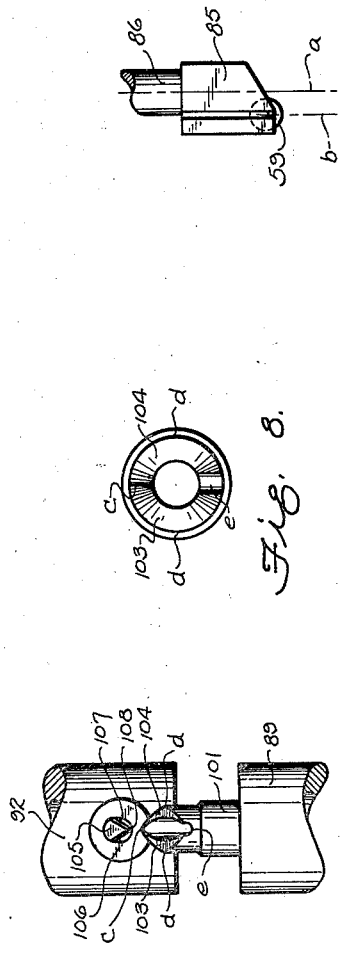
Inventors
JOSEPH P. CROWLEY,
ARTHUR W. GORALSKE.
By Frank Fraser
Attorney

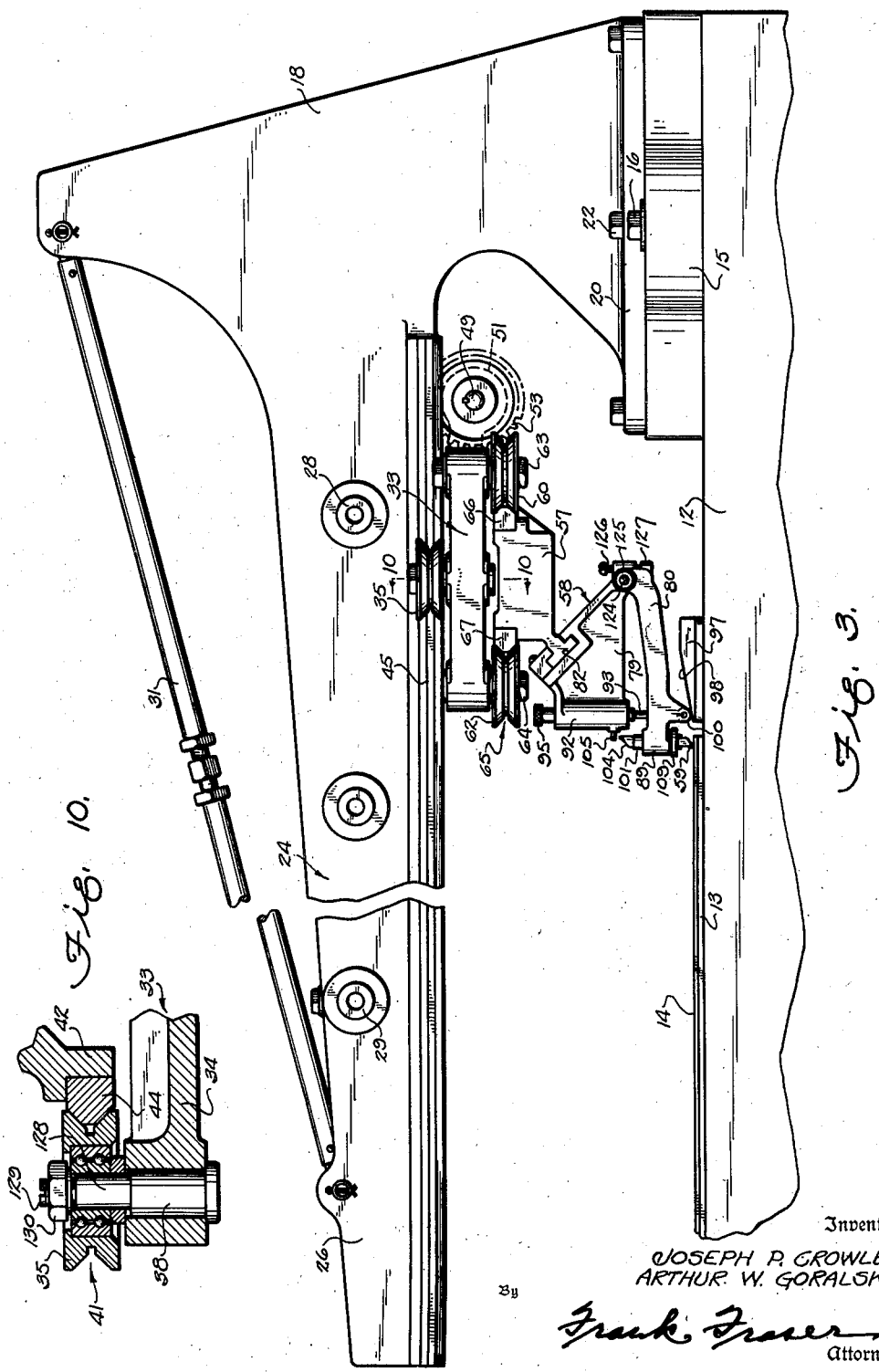

Inventors
JOSEPH P. CROWLEY,
ARTHUR W. GORALSKE.
By Frank Fraser
Attorney

Patented Jan. 20, 1942

2,270,418

UNITED STATES PATENT OFFICE 2,270,418

CUTTING MACHINE

Joseph P. Crowley and Arthur W. Goralske, Toledo, Ohio, assignors to Libbey-Owens-Ford Glass Company, Toledo, Ohio, a corporation of Ohio Application November 24, 1939, Serial No. 305,782

6 Claims. (Cl. 33—27)

The present invention relates to improvements in cutting machines generally and more particularly to a machine for cutting flat sheets or plates of glass or the like.

An important object of the invention is the provision of a machine of the above character for executing a plurality of duplicate cutting operations simultaneously, whereby a plurality of individual sheets of the same size and configuration may be cut from a relatively large sheet or plate of glass or the like in a single operation of the machine.

Another important object of the invention is the provision of a cutting machine of the above character embodying a plurality of cutting units and a template or pattern member for controlling the simultaneous movement of said cutting units through separate predetermined paths whereby to effect the cutting out of a plurality of individual sheets of the same shape and size from a relatively large sheet or plate of glass or the like.

A further important object of the invention is the provision of a cutting machine of the above character embodying a plurality of cutting units, each having a cutting tool freely rotatable about a vertical axis and mounted in such a manner that it will automatically follow any given course or direction and thereby remain in tangential relation to the line of cut at all times as the cutting unit is moved through its cutting path.

A still further important object of the invention is the provision of a cutting machine of the above character including means for raising the cutting tools from the sheet at the completion of each cutting operation and for turning them approximately 180 degrees about a vertical axis, so that when said cutting tools are again lowered onto the sheet at the beginning of the next cutting operation they will be tangent to the line of cut and thereby in proper position for cutting.

Other objects and advantages of the invention will become more apparent during the course of the following description, when taken in connection with the accompanying drawings.

In the drawings, wherein like numerals are employed to designate like parts throughout the same:

Fig. 1 is a plan view of a cutting machine constructed in accordance with the invention;

Fig. 2 is a front view of the machine;

Fig. 3 is an end view thereof;

Fig. 7 is a front view of the means for turning the cutting tool at the completion of the cutting operation to bring it into proper position for the next cut;

Fig 8 is a plan view of the cam members for turning the cutting tool;

Fig. 9 is a diagrammatic view illustrating the operation of the cutting tools; and Fig. 10 is a detail vertical section taken substantially on line 10—10 of Fig. 3.

Figure 4:
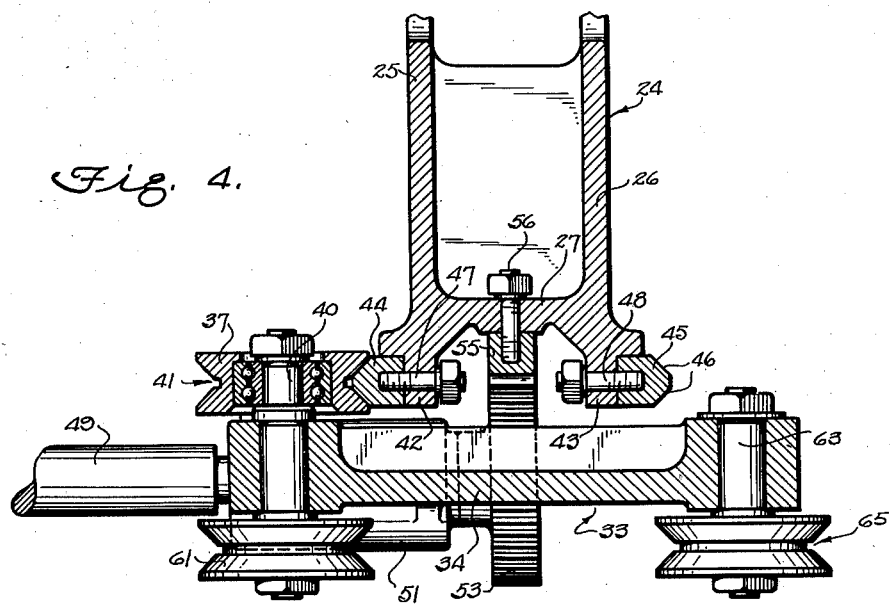
Fig. 4 is a detail transverse section taken substantially on line 4—4 of Fig. 1.

In the embodiment illustrated in the drawings, the machine comprises a horizontal rectangular table 12 provided along the forward end portion thereof with a pad 13 of felt or the like upon which the sheet or plate of glass or the like 14 to be cut is adapted to be laid. Supported upon the top of the table rearwardly of the pad 13 is a longitudinally extending supporting plate 15 secured to said table by bolts or the like 16. Mounted upon the plate 15 adjacent the opposite ends thereof are upstanding brackets 17 and 18 provided with base portions 19 and 20 which rest upon said plate and are secured thereto by bolts or the like 21 and 22 respectively. Formed integral with the brackets 17 and 18 are the forwardly extending substantially horizontal supporting arms 23 and 24 respectively which are disposed in spaced relation above the table 12 as clearly shown in Fig. 3.

Each of the supporting arms 23 and 24 comprises a pair of spaced parallel side members 25 and 26 connected together at spaced points by transverse webs 27. The supporting arms 23 and 24 are connected together by the spaced horizontal rods 28 and 29 extending longitudinally of the table and may be further supported by bracing rods 30 and 31 respectively. Mounted upon and slidable along the supporting arms 23 and 24 are the carriages 32 and 33 respectively adapted to carry the cutting mechanism as will be more fully hereinafter described.

Each carriage 32 and 33 comprises a substantially rectangular plate 34 disposed beneath the respective supporting arm 23 or 24 and carrying at one side thereof a single roller 35 and at its opposite side a pair of spaced rollers 36 and 37; the roller 35 being preferably positioned at a point midway between the two rollers 36 and 37. The rollers 35, 36, and 37 are freely rotatable on vertical shafts 38, 39, and 40 respectively carried by the plate 34, and each of said rollers is further provided with a peripheral groove 41.

Formed integral with the side members 25 and 26 of each supporting arm 23 and 24 and extending longitudinally thereof are the depending flanges 42 and 43 (Fig. 4). Carried by the flanges 42 and 43 outwardly thereof are the longitudinally extending bars 44 and 45 respectively for supporting the respective carriage 33 or 34. More specifically, the bars 44 and 45 constitute tracks along which the rollers 35 and 36—37 respectively on the carriage are adapted to run; said tracks being beveled as at 46 to fit within the grooves 41 in said rollers. The tracks 44 and 45 may be secured to the flanges 42 and 43 by screws or the like 47 and 48.

With this construction, it will be seen that the carriages 32 and 33 are freely movable along the supporting arms 23 and 24 transversely of the table 12. The two carriages, however, are adapted to be tied together so that they will be disposed in alignment with one another at all times and will likewise move in unison. To this end, there is provided a horizontal shaft 49 which extends between the carriages 32 and 33 and is mounted at its opposite ends in bearings 50 and 51 formed on said carriages. The shaft 49 projects beyond the bearings 50 and 51 and has keyed to its opposite end spur gears 52 and 53 adapted to mesh with rack bars 54 and 55 which are secured to the under sides of the supporting arms 23 and 24 respectively by screws or the like 56 and extend longitudinally thereof.

Also extending longitudinally of the table 12 beneath and at right angles to the supporting arms 23 and 24 is the cutter supporting bar 57 adapted to carry one or any desired number of cutting units 58, each of which is provided with a rotatable steel cutting wheel 59 or other suitable cutting tool such as a diamond. The cutter bar 57 is slidably supported by the carriages 32 and 33 and, to this end, each of said carriages is provided at one side with the horizontally spaced supporting rollers 60 and 61 and at the opposite side with a single supporting roller 62 preferably disposed intermediate the two rollers 60 and 61 (Fig. 2). The rollers 60 and 62 are freely rotatable upon vertical shafts 63 and 64 respectively carried by the plate 34 while the roller 61 is freely rotatable upon the lower end of the shaft 40 which carries at its upper end the roller 37. Each of the rollers 60, 61, and 62 is also preferably provided with a peripheral groove 65.

The cutter bar 57 extends between the rollers 60—61 and roller 62 and carries at its opposite sides the metal bars 66 and 67 (Fig. 5) which constitute tracks along which the rollers 60—61 and roller 62 respectively are adapted to run. The tracks 66 and 67 are preferably beveled as at 68 to fit within the grooves 65 in said rollers. Also, the tracks 66 and 67 may be secured to the cutter bar by screws or the like 69 and 70. In this way, as the carriages 32 and 33 are moved along the supporting arms 23 and 24, the cutter bar 57 can be simultaneously moved with respect to the carriages and in a direction at right angles to the movement thereof. As a result, the cutting units 58 can be simultaneously moved both transversely and longitudinally of the table to follow any given predetermined path.

As above stated, the machine is adapted to execute a plurality of duplicate cutting operations simultaneously to effect the cutting out of a plurality of sheets of the same size and shape from a relatively large sheet or plate of glass or the like. To this end, a plurality of cutting units 58 are mounted upon the cutter bar 57 at predetermined spaced points depending upon the number and/or size of sheets to be cut. During the cutting operation, the cutting units are movable simultaneously through separate predetermined paths and such movement is controlled by a template or pattern member 71. The template 71 comprises a substantially rectangular plate (Fig. 1) secured to the horizontal rods 28 and 29 by brackets 72 and 73 respectively. The template is arranged beneath said rods substantially midway between the supporting arms 23 and 24 and has formed in the under side thereof a groove or channel 74 of a configuration corresponding to the shape and size of sheets to be cut.

Secured upon the top of the cutter bar 57 is a follower comprising a cone-shaped member 75 (Fig. 2) provided at its upper end with a roller 76 which is received within the channel or groove 74 in the template. With this construction, as the cutter bar 57 is drawn forwardly over the table by the operator (from its full line position shown in Fig. 1) the roller 76 traveling in the channel 74 in the template will cause each of the cutting units 58 to follow a path corresponding to the configuration of said channel. This is possible because of the fact that the cutter bar 57 can move simultaneously both longitudinally and transversely of the table. As the cutting units are moved over the table, the cutting tools 59 engaging the glass sheet 14 will act to score the same along a plurality of individual lines of cut indicated by the numeral 77. The glass can then be broken along the score lines to give a plurality of sheets of the same shape and size. To facilitate the movement of the cutter bar 57 by the operator, there is secured to said cutter bar a handle 78.

Each cutting unit 58 comprises a supporting casting 79 and a substantially horizontal cutting tool supporting arm 80 pivoted at its rear end to said casting as at 81. The cutter bar 57 is formed along its forward edge with a substantially T-shaped attaching rib 82 (Fig. 5), while the casting 79 is provided with a complemental groove 83 for receiving said T-shaped rib therein, whereby to slidably support the cutting unit. The cutting unit can be secured in the desired position upon the rib by a set screw 84.

The cutting wheel 59 is carried by a cutter head 85 provided at the lower end of a cutter holder 86. The cutter holder 86 is in the form of a vertical cylindrical spindle journaled in vertically spaced ball bearing assemblies 87 and 88 mounted in a bearing portion 89 formed at the outer end of the cutter arm 80. The arm 80 is normally urged downwardly to maintain the cutting wheel 59 in yieldable engagement with the glass sheet 14 during the cutting operation. This is accomplished by the provision of a vertical pin 90 which is received within a vertical opening 91 formed in a cylindrical portion 92 formed on the casting 79. The pin 90 projects downwardly beyond the casting and is provided at its lower end with an enlarged portion 93 engaging a wear plate 94 carried by the cutter arm 80. Threaded within the upper end of the opening 91 is a nut 95. Encircling the pin 90 within opening 91 is a compression spring 96 which serves to urge the said pin downwardly into engagement with wear plate 94 thereby serving to maintain the cutting wheel 59 in yieldable engagement with the glass sheet.

One of the important features of the cutting unit 58 is that the cutter holder 86 is mounted to turn freely within the bearing portion 89, as a result of which the cutting wheel 59 will automatically adjust itself to follow any given course or direction. Thus, as shown in Fig. 9, the vertical axis about which the cutter holder 86 turns is designated $a$ while the horizontal axis about which the cutting wheel rotates is designated $b$. The horizontal axis of rotation of the cutting wheel is therefore laterally offset with respect to the vertical axis of rotation of the cutter holder so that the cutting wheel is caused to trail said cutter holder upon horizontal movement of the cutting unit and be thereby constantly maintained in its most effective cutting position, eliminating all binding and cramping. This trailing action increases the ease of operation, materially decreases the wear of the cutting wheel in use, and provides for the cutting of regular and irregular curves with greater speed and accuracy. By means of this arrangement, the cutting wheel will remain in tangential relation to the line of cut at all times. That is to say, since the cutting wheel is out of alignment with the vertical axis about which the cutter holder rotates, the said wheel will lag behind upon movement of the cutting unit and thus hold its proper relation to the line of cut. The cutting wheel is not guided by contact with any template or pattern member but is led in its most effective cutting position throughout its course by simply following the freely rotating holder.

Figures 5, 6:
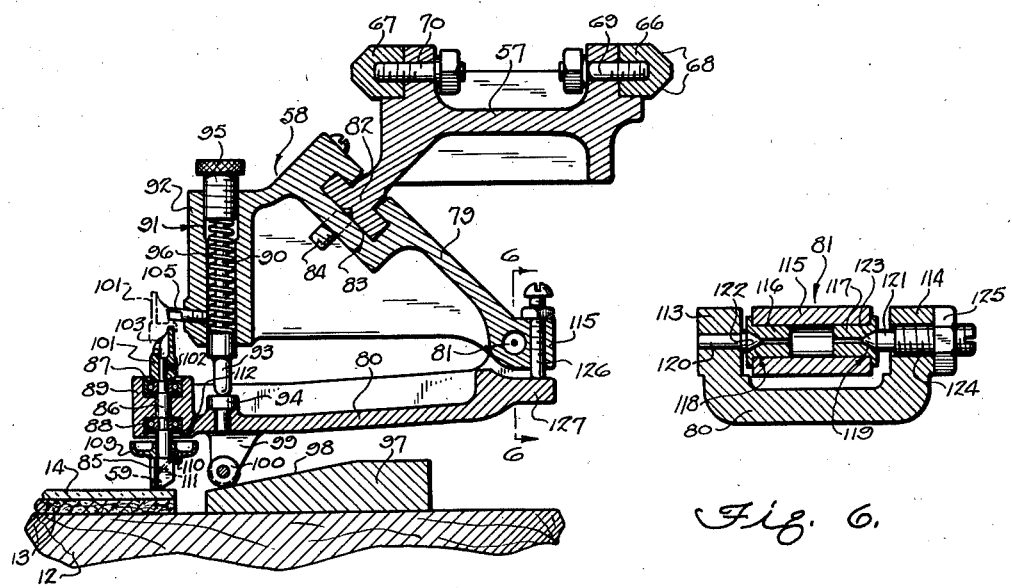
Fig. 5 is a vertical longitudinal section through one of the cutting units taken substantially on line 5—5 of Fig. 2.
Fig. 6 is a detail vertical section taken substantially on line 6—6 of Fig. 5.

In order to prevent chipping or spalling of the rear edge of the glass sheet as well as injury to the cutting wheel as said wheel passes onto or leaves the sheet, means is provided for lifting the cutting wheel from the sheet just before it reaches the rear edge thereof at the completion of the cutting operation and for also bringing the cutting wheel into engagement with the sheet slightly inwardly of said edge at the beginning of the cutting operation. To this end, there are secured upon the upper surface of the table 12 a plurality of blocks 97; one of said blocks being positioned at each point where one of the cutting wheels will begin and end its cutting movement. Each of the blocks 97 is provided with an upper cam surface 98 while carried by the arm 80 of each cutting unit is a bracket 99 supporting a freely rotatable roller 100 adapted to engage said cam surface (Fig. 5). When the cutting unit reaches the end of its cutting movement and the roller 100 rides up on the cam surface 98, the cutter arm 80 will be moved upwardly about its pivot 81, against the action of the spring 96, to lift the cutting wheel 59 off of the glass sheet. The block 97 is so positioned that the cutting wheel will be lifted from the glass sheet just before it reaches the rear edge thereof and likewise will be lowered upon the sheet slightly inwardly of said edge at the beginning of the next cutting operation.

When using cutting wheels of the so-called caster or swivel type as described above, we have found that when the cutting wheel is lifted from the glass sheet there is a tendency for it to turn slightly in one direction or the other due to jar, etc., with the result that when the wheel is again lowered onto the sheet it is very apt to be disposed at an angle to the line of cut. As the cutting unit is then moved over the glass, the wheel will of course automatically swing into proper position behind the cutter holder but in so doing will tend to scratch or mar the glass surface. To avoid this objectional feature, the present invention contemplates the provision of means for accurately positioning the cutting wheel upon being lifted from the glass sheet so that when it is returned thereto at the beginning of the next cutting operation, it will be tangent to the line of cut. The means for positioning the cutting wheel also effects the turning thereof about a vertical axis approximately 180 degrees upon being lifted from the glass so that it is in proper position for making the next cut. To this end, there is carried by the cutter holder 86 a cam member 101 in the form of a cylindrical sleeve which fits over the upper end of said cutter holder and is secured thereto by a screw or the like 102. As shown in Figs. 5, 7, and 8, the upper end of the sleeve 101 is formed with a pair of diametrically opposed cam surfaces 103 and 104 which curve downwardly, outwardly, and forwardly from the high point $c$ to the midway point $d$ and from then downwardly, inwardly, and forwardly to the recess $e$ which constitutes the low point of the cam and is disposed opposite the high point $c$.

Carried by the cylindrical portion 92 on casting 79, adjacent the lower end thereof, is a forwardly projecting substantially horizontal pin 105 having opposite flat side faces 106 and 107 converging downwardly to a relatively sharp edge 108. Upon upward movement of the cutter holder 86 one of the cam surfaces 103 or 104 of cam member 101 will engage the pin 105 and upon continued upward movement of the said holder, the pin 105 will cause the cam member 101 to be turned approximately 180 degrees to the position indicated in broken lines in Fig. 5. At this time, the pin 105 will be received within the recess $e$ at the low point of the cam. This turning of the cam member will reverse the position of the cutting wheel 59 and will bring it into such position that when it is lowered upon the glass sheet at the beginning of the next cutting operation it will be tangent to the line of cut and in position for making the cut. Since the cutter holder may turn slightly in either direction upon upward movement thereof, either the cam surface 103 or 104 will engage the pin 105 and be turned thereby.

To facilitate oiling of the cutting wheel 59 there may be carried by the cutter holder 86 a cup 109 having an opening 110 therein communicating with an opening 111 in cutter head 85 leading to the cutting wheel. The cutter arm 80 can also be provided with an opening 112 through which oil can be supplied to the cup 109.

In order to permit ready and convenient removal of each cutting wheel for the purpose of repair or replacement and without requiring the removal of the entire cutting unit 58 from the cutter bar 57, the pivot 81 connecting the cutter arm 80 to the casting 79 is of a novel construction as illustrated in Fig. 6. As shown, the cutter arm 80 is provided at its rear end with the spaced upstanding ears 113 and 114 between which is received a foot portion 115 formed at the lower rear end of casting 79. This foot portion has a horizontal opening therethrough closed at its opposite ends by bushings 116 and 117 which are provided at their outer ends with flared openings 118 and 119 respectively. Carried by the ears 113 and 114 are horizontal pins 120 and 121, the inner ends of which are tapered as at 122 and 123 to fit within the flared openings 118 and 119 respectively. The pin 120 is preferably fixed while the pin 121 is carried by a screw 124 threaded within the ear 114 and carrying at its outer end a lock nut 125. When it is desired to remove the cutting wheel, it is simply necessary to first loosen nut 125 and then thread the screw 124 outwardly to disengage pin 121 from the bushing 117 whereupon the cutter arm 80 can be bodily removed by simply disengaging it from pin 120 and drawing the same forwardly. The downward movement of the cutter arm 80 is limited by a set screw 126 passing vertically through the foot portion 115 of casting 79 and engaging an ear 127 at the rear end of said cutter arm.

As shown in Fig. 10, the shaft 38 for each roller 35 is preferably provided at its upper end with an eccentric portion 128 upon which the said roller is mounted. The upper end of the shaft is threaded as at 129 to receive the nut 130. By this construction, it is possible to prevent any side play or lateral vibratory movement of the cutter carriages 23 and 24 during the cutting operation. Further, it is possible to take up any play which might result from wear on the carriage supporting rollers or tracks. Thus, when it is desired to take up any side play occasioned by one reason or another, it is simply necessary for the operator to first loosen the nut 130 and rotate the shaft 38. Due to the fact that the roller 35 is mounted upon the eccentric portion 128, the said roller can be moved toward and into proper relation with the track. After the desired take up has been effected, the operator simply tightens nut 130.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In a machine for cutting sheets or plates of glass and the like, a table for supporting the sheet to be cut in a horizontal position, a cutter support positioned above said table, a cutting unit carried by said cutter support and including a cutting tool freely rotatable about a vertical axis and having a cutting edge, means for mounting said cutter support for horizontal movement to carry said cutting tool over and in engagement with the sheet to score the same, means engageable by said cutting unit at the completion of the cutting operation for raising said cutting tool from the sheet, and means effective upon raising of said cutting tool for bringing the same into position so that when it is returned to the sheet at the beginning of the next cutting operation the cutting edge thereof will be tangent to the line of cut.

2. In a machine for cutting sheets or plates of glass and the like, a table for supporting the sheet to be cut in a horizontal position, a cutter support positioned above said table, a cutting unit carried by said cutter support and including a cutting tool freely rotatable about a vertical axis and having a cutting edge, means for mounting said cutter support for horizontal movement to carry said cutting tool over and in engagement with the sheet to score the same, means for raising the cutting tool from the sheet at the completion of the cutting operation, and cam means controlled by raising movement of said cutting tool for bringing the said tool into position so that when it is returned to the sheet at the beginning of the next cutting operation the cutting edge thereof will be tangent to the line of cut.

3. In a machine for cutting sheets or plates of glass and the like, a table for supporting the sheet to be cut in a horizontal position, a cutter support positioned above said table, a cutting unit carried by said cutter support and including a cutter holder freely rotatable about a vertical axis and a cutting tool carried thereby and having a cutting edge, means for mounting said cutter support for horizontal movement to carry said cutting tool over and in engagement with the sheet to score the same, means for raising the cutting tool from the sheet at the completion of the cutting operation, a cam member carried by said cutter holder, and means carried by said cutting unit and engageable by said cam member upon raising movement of said cutting tool for bringing the said tool into position so that when it is returned to the sheet at the beginning of the next cutting operation the cutting edge thereof will be tangent to the line of cut.

4. In a machine for cutting sheets or plates of glass and the like, a table for supporting the sheet to be cut in a horizontal position, a cutter support positioned above said table, a cutting unit carried by said cutter support including a cutter holder freely rotatable about a vertical axis, a cutting tool carried by said holder in offset relation to said vertical axis so that said cutting tool will be caused to trail the said holder upon movement of said cutting unit, means for mounting said cutter support for horizontal movement to carry the cutting tool over and in engagement with the sheet to score the same, means for raising said cutting tool from the sheet at the completion of the cutting operation, and means for turning said holder and cutting tool approximately 180 degrees about a vertical axis so that when the said tool is subsequently lowered to engage the next sheet to be cut it will be in proper position for the cutting operation.

5. In a machine for cutting sheets or plates of glass and the like, a table for supporting the sheet to be cut in a horizontal position, a cutter support positioned above said table, a cutting unit carried by said cutter support including a cutter holder freely rotatable about a vertical axis, a cutting tool carried by said holder in offset relation to said vertical axis so that said cutting tool will be caused to trail the said holder upon movement of said cutting unit, means for mounting said cutter support for horizontal movement to carry the cutting tool over and in engagement with the sheet to score the same, means for raising said cutting tool from the sheet at the completion of the cutting operation, and cam means for turning said holder and cutting tool approximately 180 degrees about a vertical axis so that when the said tool is subsequently lowered to engage the next sheet to be cut it will be in proper position for the cutting operation.

6. In a machine for cutting sheets or plates of glass and the like, a table for supporting the sheet to be cut in a horizontal position, a cutter support positioned above said table, a cutting unit carried by said cutter support including a cutter holder freely rotatable about a vertical axis, a cutting tool carried by said holder in offset relation to said vertical axis so that said cutting tool will be caused to trail the said holder upon movement of said cutting unit, means for mounting said cutter support for horizontal movement to carry the cutting tool over and in engagement with the sheet to score the same, means for raising said cutting tool from the sheet at the completion of the cutting operation, a cam member carried by said holder, and means carried by the cutting unit and engageable by said cam member, upon raising of the cutting tool, for turning the said holder and cutting tool approximately 180 degrees about a vertical axis so that when the said tool is subsequently lowered to engage the next sheet to be cut, it will be in proper position for cutting.

JOSEPH P. CROWLEY.
ARTHUR W. GORALSKE.